(12) United States Patent
Burov et al.

(10) Patent No.: US 8,503,071 B2
(45) Date of Patent: Aug. 6, 2013

(54) OPTICAL FIBER AMPLIFIER HAVING NANOSTRUCTURES

(75) Inventors: Ekaterina Burov, Boulogne-Billancourt (FR); Alain Pastouret, Massy (FR); Cedric Gonnet, Paris (FR); Christine Collet, Mennecy (FR); Olivier Cavani, Angervilliers (FR)

(73) Assignee: Draka Comteq B.V., Amsterdam (NL)

( * ) Notice: Subject to any disclaimer, the term of this patent is extended or adjusted under 35 U.S.C. 154(b) by 564 days.

(21) Appl. No.: 12/708,810

(22) Filed: Feb. 19, 2010

(65) Prior Publication Data

US 2010/0214649 A1 Aug. 26, 2010

(30) Foreign Application Priority Data

Feb. 20, 2009 (FR) ...................... 09 00773

(51) Int. Cl.
*H04B 10/17* (2006.01)
*H04B 10/12* (2006.01)

(52) U.S. Cl.
USPC ............. 359/341.5; 359/341.1; 977/777; 977/779; 977/810; 977/951

(58) Field of Classification Search
USPC ............ 359/341.5, 334; 977/777, 779, 810, 977/951

See application file for complete search history.

(56) References Cited

U.S. PATENT DOCUMENTS

| | | | |
|---|---|---|---|
| 4,838,643 A | 6/1989 | Hodges et al. | |
| 5,574,816 A | 11/1996 | Yang et al. | |
| 5,717,805 A | 2/1998 | Stulpin | |
| 5,761,362 A | 6/1998 | Yang et al. | |
| 5,911,023 A | 6/1999 | Risch et al. | |
| 5,982,968 A | 11/1999 | Stulpin | |
| 6,035,087 A | 3/2000 | Bonicel et al. | |
| 6,066,397 A | 5/2000 | Risch et al. | |
| 6,085,009 A | 7/2000 | Risch et al. | |
| 6,134,363 A | 10/2000 | Hinson et al. | |
| 6,175,677 B1 | 1/2001 | Yang et al. | |
| 6,181,857 B1 | 1/2001 | Emeterio et al. | |

(Continued)

FOREIGN PATENT DOCUMENTS

| | | |
|---|---|---|
| CN | 101288212 A | 10/2008 |
| EP | 1347545 A | 9/2003 |

(Continued)

OTHER PUBLICATIONS

Dhawan et al. "Plasmon resonances of gold nanoparticles incorporated inside an optical fibre matrix", Nanotechnology, vo. 17, pp. 2504-2511, (Apr. 2006).*

(Continued)

*Primary Examiner* — Eric Bolda
(74) *Attorney, Agent, or Firm* — Summa, Additon & Ashe, P.A.

(57) ABSTRACT

Disclosed is a stimulated Raman scattering effect (SRS), amplifying optical fiber that includes a central core comprising a dielectric matrix that is capable of vibrating at a given frequency ($\omega_{Raman}$) under the effect of a pump signal. The optical fiber includes at least one kind of metallic nanostructure that is capable of generating surface plasmon resonance (SPR) in the optical fiber. The metallic nanostructures have a shape and composition such that the frequency of their surface plasmon resonance ($\omega_{plasmon}$) corresponds to the frequency of the pump signal ($\omega_{pump}$) and/or the frequency of the optical signal transmitted in the optical fiber ($\omega_{signal}$).

26 Claims, 5 Drawing Sheets

U.S. PATENT DOCUMENTS

| | | | |
|---|---|---|---|
| 6,210,802 B1 | 4/2001 | Risch et al. |
| 6,215,931 B1 | 4/2001 | Risch et al. |
| 6,314,224 B1 | 11/2001 | Stevens et al. |
| 6,321,012 B1 | 11/2001 | Shen |
| 6,321,014 B1 | 11/2001 | Overton et al. |
| 6,334,016 B1 | 12/2001 | Greer, IV |
| 6,381,390 B1 | 4/2002 | Hutton et al. |
| 6,493,491 B1 | 12/2002 | Shen et al. |
| 6,603,908 B2 | 8/2003 | Dallas et al. |
| 6,608,716 B1 | 8/2003 | Armstrong et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,807,323 B2 | 10/2004 | Beom et al. |
| 6,912,347 B2 | 6/2005 | Rossi et al. |
| 6,922,515 B2 | 7/2005 | Nechitailo et al. |
| 6,941,049 B2 | 9/2005 | Risch et al. |
| 7,031,590 B2 | 4/2006 | Gasca et al. |
| 7,045,010 B2 | 5/2006 | Sturman, Jr. |
| 7,123,359 B2 | 10/2006 | Armstrong et al. |
| 7,162,128 B2 | 1/2007 | Lovie et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,440,166 B2 | 10/2008 | Burov et al. |
| 7,471,448 B2 * | 12/2008 | Chen et al. | 359/334 |
| 7,483,613 B2 | 1/2009 | Bigot-Astruc et al. |
| 7,515,795 B2 | 4/2009 | Overton et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,724,424 B2 * | 5/2010 | Tamaoki | 359/341.3 |
| 7,724,998 B2 | 5/2010 | Parris et al. |
| 7,817,891 B2 | 10/2010 | Lavenne et al. |
| 8,014,647 B2 | 9/2011 | Blanchandin et al. |
| 2005/0135759 A1 | 6/2005 | Wang et al. |
| 2005/0237602 A1 | 10/2005 | Yanagisawa |
| 2008/0292262 A1 | 11/2008 | Overton et al. |
| 2009/0116798 A1 | 5/2009 | Blanchandin et al. |
| 2009/0175583 A1 | 7/2009 | Overton |
| 2009/0207486 A1 * | 8/2009 | Burov et al. | 359/341.5 |
| 2009/0214167 A1 | 8/2009 | Lookadoo et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2011/0044595 A1 | 2/2011 | Sillard et al. |
| 2011/0069724 A1 * | 3/2011 | Richard et al. | 372/6 |

FOREIGN PATENT DOCUMENTS

| | | |
|---|---|---|
| EP | 1921478 A1 | 5/2008 |
| EP | 2221930 A1 | 8/2010 |
| JP | 2001-255564 A | 9/2001 |
| WO | 2007/020362 A | 2/2007 |
| WO | 2009/062131 A1 | 5/2009 |

OTHER PUBLICATIONS

Garell, R.L., "Surface-Enhanced Raman Spectroscopy" Analytical Chemistry, 1989, 61, pp. 401-411.

Kalkman et al., "Surface Plasmon Polariton Modified Emission of Erbium in a Metallodielectric Grating", Applied Physics Letters, vol. 83, No. 1, Jul. 7, 2003, pp. 1-3.

Kalkman et al., "Coupling of Er ions to Surface Plasmons on Ag", Applied Physics Letters, vol. 86, (2005), 041113-1-3, pp. 1-3.

Mertens et al., "Plasmon-Enhanced Erbium Luminescence", Applied Physics Letters, vol. 89, 2006, Jul. 7, 2111, pp. 1-3.

Aizpurua et al., "Optical Properties of Gold Nanorings", Physical Review Letters, vol. 90, No. 5, Feb. 7, 2003.

Oldenburg et al., "Nanoengineering of Optical Resonances", Chemical Physics Letters, May 22, 1998, pp. 243-247.

Prodan et al., "A Hybridation Model for the Plasmon Response of Complex Nanostructures", Science, vol. 302, Oct. 17, 2003.

Wang et al., "Symmetry Breaking in Individual Plasmonic Nanoparticles", PNAS, vol. 103, No. 29, Jul. 18, 2006, pp. 1-5.

Pastouret et al., "Nanoparticle doping process for improved fibre amplifiers and lasers", SPIE, vol. 7195 (2009), pp. 1-8.

French Search Report in counterpart French Application No. 0900773, dated Sep. 7, 2009, pp. 1-8.

Cereyon et al., "Raman amplification in nanoparticles doped glasses", Journal of Non-Crystalline Solids, North-Holland Physics Publishing, Amestern, NL, vol. 354, No. 29, Jul. 1, 2008, pp. 1-4.

European Search Report in counterpart European Application No. 10075059 dated May 10, 2010, pp. 1-5.

Chinese Office Action in counterpart Chinese Application No. 20100110125.1 dated Aug. 1, 2012, pp. 1-5.

English translation of Chinese Office Action in counterpart Chinese Application No. 20100110125.1 dated Aug. 1, 2012, pp. 1-7.

European Patent Office Intention to Grant in counterpart European Application No. 10075059.5 dated Oct. 22, 2012, pp. 1-34.

* cited by examiner

OPTICAL FIBER AMPLIFIER HAVING NANOSTRUCTURES

CROSS-REFERENCE TO PRIORITY APPLICATION

This application claims the benefit of pending French application Ser. No. 09/00773 for "Optical Fiber Designed for High Efficiency Raman Gain" (filed Feb. 20, 2009, at the National Institute of Industrial Property (France)), which is hereby incorporated by reference in its entirety.

FIELD OF THE INVENTION

The present invention relates to the field of optical fibers and, more specifically, to an optical fiber amplifier for amplifying transmitted optical signals. Optical fiber amplifiers can be used, for example, as high-speed transmission line amplifiers.

BACKGROUND

Fiber amplifiers can be optical fibers doped with rare earth elements, such as erbium. Such optical fibers, which are used in Erbium Doped Fiber Amplifiers (EDFA), have a central core formed of a silica matrix having erbium doping elements, possibly combined with additional doping elements to facilitate improved amplification.

Optical amplification in an EDFA-type optical fiber works by injecting into the optical fiber a pump signal that excites the doping element's ions ($Er^{3+}$). When a light signal passes through this portion of optical fiber, it de-excites the ions by laser effect, producing a photon that is completely identical to the incident photon. In this way, the light signal is thus doubled.

Fiber amplifiers can also employ the Raman effect. Raman amplification does not use the atomic transitions of doped rare earth ions in the optical fibers but rather is based on an exchange of energy by Raman scattering.

Raman scattering is a process of inelastic scattering of the incident light in a material, which involves interactions with atomic vibrations of the matrix. Every material has a spontaneous Raman emission spectrum at given wavelengths (i.e., it behaves like a network of oscillators vibrating at a given frequency). The Raman spectrum of a glass, like that of a disordered amorphous material, is characterized by a large number of wavelengths forming a continuous spectrum over a wide frequency band. The intensity of the Raman emission increases with the input power applied to the material and becomes significant at a given power. This phenomenon is known as stimulated Raman scattering (SRS). It is thus possible, using the Raman emission of a material, to greatly amplify an optical signal by passing it through the material stimulated beforehand by an optical pump signal. In this kind of amplification, a pump photon is converted to another lower energy photon at the same wavelength as the signal.

A pump signal with a lower frequency than the signal to be amplified is used to ensure the amplification of an optical signal by SRS, with the frequency difference between the pump signal and the transmitted signal being approximately equal to the vibration frequency of the medium (typically 13.2 THz for silica). Thus, for stimulated Raman amplification of a 1550-nanometer signal, a 1450-nanometer pump signal is injected into the silica fiber.

The Raman amplification gain G, expressed in dB, can be expressed as follows:

$$G = (10 \div \ln 10) \cdot C_R \cdot P_p \cdot L_{\mathit{eff}}$$

where
$C_R$ (in $W^{-1} \cdot km^{-1}$) is the optical fiber Raman coefficient:

$$C_R = g_R \div A_{\mathit{eff}}$$

wherein $g_R$ is the intrinsic Raman gain of the material (in km/W), and $A_{\mathit{eff}}$ is the effective area of the optical fiber at the pump wavelength (in $km^2$);
$P_p$ is the power of the pump signal (in watts); and
$L_{\mathit{eff}}$ is the effective length of the optical fiber at the pump wavelength (in km), and can be specified by the equation:

$$L_{\mathit{eff}} = (1 - e^{-\alpha_p L}) \div \alpha_p$$

wherein $\alpha_p$ is the linear attenuation coefficient (in dB/km) and L is the length of the optical fiber.

Thus, to increase the efficiency of the Raman amplification (i.e., the Raman amplification gain G), it is possible to increase the intrinsic Raman gain of the material ($g_R$) or to reduce the effective area of the optical fiber ($A_{\mathit{eff}}$), either of which gives rise to an increased Raman coefficient ($C_R$). Alternatively, it is possible to reduce the optical losses ($\alpha_p$) at the pump wavelength or to increase the power of the pump ($P_p$).

Increasing the power of the pump ($P_p$) involves the use of costly lasers. This solution is impractical when low-cost, all-optical systems are sought.

An increase in the intrinsic Raman gain ($g_R$) might be achieved by modifying the composition of the optical-fiber core, such as by adding germanium doping to a silica core or by producing optical fibers with a tellurite core rather than a silica core. This solution, however, leads to an increase in the optical transmission losses and poses a problem of compatibility with other optical fibers in an optical system that uses standard optical fibers.

Similarly, reducing the optical fiber's effective area ($A_{\mathit{eff}}$) to improve the Raman amplification gain (G) leads to problems of compatibility with existing optical transmission system standards and causes an increase in the optical transmission losses.

It has also been proposed to improve the Raman amplification gain (G) by adding rare earth dopants to the optical-fiber core. This solution, however, does not produce satisfactory results because of the absorption of the signal by the rare earth ions.

Finally, the production of a Raman fiber amplifier requires a compromise between the Raman coefficient ($C_R$) on the one hand and the optical losses of the optical fiber on the other. In the literature, this compromise is often estimated by the Figure of Merit (FOM), expressed in $W^{-1} \cdot dB^{-1}$, which represents the ratio between the Raman coefficient of the fiber ($C_R$) expressed in $W^{-1} \cdot km^{-1}$ and the optical losses in the optical fiber ($\alpha_p$) expressed in $dB \cdot km^{-1}$ at the wavelength of the pump. Typically, for standard single-mode fibers (e.g., having with a silica core containing less than 5 weight percent germanium and an effective area of 80 $\mu m^2$) intended for Raman amplification, the Raman FOM is limited to 3.2 $W^{-1} \cdot dB^{-1}$.

Consequently, there is a need for an optical fiber amplifier that has an improved Raman FOM and yet is compatible with standard optical fibers.

An electromagnetic wave, such as light propagating in the optical fiber, can polarize the electron cloud surrounding nanostructures that are present in the optical-fiber core, thus creating coherent collective oscillation (known as "surface plasmon"). When a wavelength is injected under resonance conditions with the oscillation wavelength of this polarized cloud, the energy can be transferred to this wavelength. The resonance wavelength of the nanostructures depends on their shape and size and the nature of the metal of the nanostructure.

The phenomenon of Surface Plasmon Resonance (SPR) has been observed.

For example, the publication "*Optical Properties of Gold Nanorings*" by J. Aizpurua et al., Physical Review Letters, Vol. 90, No. 5, Feb. 7, 2003, describes the optical response of ring-shaped gold nanoparticles arranged in a glass matrix.

The publications "*Nanoengineering of Optical Resonances*" by S. J. Oldenburg et al., Chemical Physics Letters, May 22, 1998, pp. 243-247, and "A Hybridation Model for the Plasmon Response of Complex Nanostructures" by E. Prodan et al., Science, Vol. 302, Oct. 17, 2003, describe different shapes and compositions of nanoparticles and the resulting optical resonance.

The publication "*Symmetry Breaking in Individual Plasmonic Nanoparticles*" by Hui Wang et al., PNAS, Vol. 103, No. 29, Jul. 18, 2006, describes nanoparticles composed of a dielectric core and a metallic shell. This publication describes more specifically the effect of the size of the metallic shell of the nanoparticles on the surface plasmon resonance shift.

The publication "*Surface-Enhanced Raman Spectroscopy*" by R.L. Garell, in Analytical Chemistry, 1989, 61, pp. 401-411, describes a molecule characterization technique using SRS amplification with silver nanoparticles in solution.

Furthermore, the publications "*Surface Plasmon Polariton Modified Emission of Erbium in a Metallodielectric Grating*" by J. Kalkman et al., Applied Physics Letters, Vol. 83, No. 1, Jul. 7, 2003, "*Coupling of Er ions to Surface Plasmons on Ag*" by J. Kalkman et al., Applied Physics Letters, Vol. 86, 2005, 041113-1-3, and "*Plasmon-Enhanced Erbium Luminescence*" by H. Mertens et al., Applied Physics Letters, Vol. 89, 2006, 211107-1-3, describe an increase in the light intensity emitted by the erbium ions arranged in proximity to silver nanoparticles. It is thus possible to reduce the thermal effects in a planar guide.

Metallic nanoparticles have also been used for optical sensors. For example, U.S. Pat. Nos. 6,608,716 and 7,123,359, each of which is hereby incorporated by reference, describe optical sensors having microcavities constituted of a dielectric substance doped with metal, semi-metal, and/or semiconductor atoms and having a plurality of nanoparticles aggregated to form a fractal structure. U.S. Pat. No. 6,807,323, which is hereby incorporated by reference, describes an optical sensor using the phenomenon of Surface Plasmon Resonance (SPR) between a thin conducting film and a thin dielectric film doped with rare earth elements or transition metals.

The phenomenon of Surface Plasmon Resonance (SPR), however, has not been used to improve the Raman gain of a fiber amplifier. The manufacturing constraints of optical fibers impose choices on the nature, size, and shape of the incorporated nanostructures.

Optical fibers including nanoparticles are generally known. For example, European Patent No. 1,347,545 (and its counterpart U.S. Pat. No. 7,031,590), or International Publication No. 2007/020362 (and its counterpart U.S. Patent Publication No. 2009/0116798), all of which are hereby incorporated by reference, describe optical fibers including nanoparticles in the optical-fiber core. The nanoparticles described in these publications include a rare earth doping element and at least one element improving the amplification of the signal, such as aluminum, lanthanum, antimony, bismuth, or other element.

These foregoing documents, however, do not describe metallic nanoparticles allowing for the creation of a phenomenon of Surface Plasmon Resonance (SPR) in the core of an optical fiber.

As noted, a need exists for an optical fiber amplifier that has an improved Raman FOM while retaining compatibility with standard optical fibers.

SUMMARY

Accordingly, in one aspect, the present invention relates to a stimulated Raman effect optical fiber amplifier. The present optical fiber amplifiers can exploit the phenomenon of Surface Plasmon Resonance (SPR) of metallic nanostructures present in a dielectric matrix. In this regard, an exemplary amplifying optical fiber includes metallic nanostructures that allow for the creation of a phenomenon of Surface Plasmon Resonance (SPR) in the optical fiber's core to promote an increase in the Raman gain.

An exemplary Raman effect optical fiber has a core that is capable of ensuring the transmission of an optical signal and a surrounding cladding that is capable of confining the optical signal transmitted in the core. The core has a dielectric matrix capable of vibrating at a given frequency under the effect of a pump signal such that the transmitted optical signal is amplified by Raman effect. In particular, the Raman effect optical fiber includes at least one kind of metallic nanostructure that is capable of generating a surface plasmon resonance in the optical fiber. The metallic nanostructures have a shape and composition such that the frequency of their surface plasmon resonance corresponds to the frequency of the pump signal and/or the frequency of the optical signal transmitted in the optical fiber. At least one of the dimensions of the metallic nanostructures (e.g., the nanostructure length or thickness) is typically between 1 nanometer and 20 nanometers (nm). Most of the nanostructures, if not substantially all of the nanostructures, have at least one dimension between about 1 nanometer and 20 nanometers. The total volume of the metallic nanostructures (i.e., the cumulative nanostructure volume) is typically less than 2 percent of the total volume of the optical fiber's core.

According to one exemplary embodiment, the metallic nanostructures are present in the optical fiber's central core. The metallic nanostructures typically have a composition and a shape such that the bandwidth of their surface plasmon resonance is greater than the vibration frequency of the dielectric matrix of the optical fiber's core.

According to another exemplary embodiment, the metallic nanostructures are present in a ring (e.g., a portion of the inner cladding) surrounding the optical fiber's central core. The optical signal is transmitted in the optical fiber's core and the pump signal is transmitted in the ring.

According to yet another exemplary embodiment, the core's dielectric matrix is silica based. The core's dielectric matrix may be doped with an element, such as germanium (Ge), phosphorus (P), fluorine (F), boron (B), aluminum (Al), tantalum (Ta), and/or tellurium (Te) (e.g., a combination of two or more of these dopants).

According to yet another exemplary embodiment, the metallic nanostructures may include a metal, such as gold (Au), silver (Ag), copper (Cu), aluminum (Al), tungsten (W), nickel (Ni), palladium (Pd), rhodium (Rh), iridium (Ir), ruthenium (Ru), molybdenum (Mo), osmium (Os), and/or platinum (Pt) (e.g., a combination of two or more of these metals).

According to yet another exemplary embodiment, the metallic nanostructures have a melting temperature greater than or equal to 950° C. and/or an evaporating temperature greater than or equal to 2100° C.

According to yet another exemplary embodiment, the metallic nanostructures have a substantially spherical shape with a diameter between about 1 nanometer and 10 nanometers.

According to yet another exemplary embodiment, the metallic nanostructures have a substantially oval shape defining a small diameter (a) and a large diameter (b). Typically, the small diameter (a) is between 1 nanometer and 10 nanometers. In this embodiment, the ratio of the large diameter to the small diameter (b/a) is typically between 1 and 2000.

According to yet another exemplary embodiment, the metallic nanostructures have a dielectric core surrounded by an external metallic shell. The metallic shell typically has an outer diameter of between 1 nanometer and 20 nanometers and a thickness of less than 5 nanometers. The ratio between the diameter of the dielectric core and the outer diameter of the metallic nanostructure is typically between 0.5 and 1.

According to yet another exemplary embodiment, the metallic nanostructures have a metallic core, an internal dielectric shell, and an external metallic shell. An exemplary metallic nanostructure typically has an outer diameter of between 1 nanometer and 20 nanometers. The thickness of the external metallic shell is typically less than 5 nanometers.

According to yet another exemplary embodiment, the present optical fiber has a Raman Figure of Merit (FOM) greater than 10 $W^{-1} \cdot dB^{-1}$ for a fiber length of less than 500 meters. Here, the Raman Figure of Merit is defined as the ratio between the optical fiber's Raman coefficient (CR) and the optical fiber's losses, wherein the optical fiber's Raman coefficient (CR) is further defined as the ratio between the core material's intrinsic Raman gain ($g_R$) and the optical fiber's effective area ($A_{eff}$) at the pump wavelength. According to a particular embodiment, the Raman Figure of Merit (FOM) is greater than 20 $W^{-1} \cdot dB^{-1}$ for a fiber length of less than 500 meters.

In another aspect, the invention embraces an optical amplifier or a laser that includes at least a portion of the present optical fiber.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention embraces an optical fiber amplifier that exploits the phenomenon of Surface Plasmon Resonance (SPR) by including metallic nanostructures present in a dielectric material. In this regard, the present invention is described (below) with reference to a stimulated Raman scattering effect (SRS) optical fiber amplifier.

Typically, an optical fiber includes (i) an optical core, which transmits and, if applicable, amplifies an optical signal, and (ii) an optical cladding, which functions to confine the optical signal in the optical core. To this end, the respective refractive indices of the core ($n_c$) and the cladding ($n_g$) are such that $n_c > n_g$. For a Raman effect fiber amplifier, the core is typically made of germanium-doped silica and the cladding is typically made of non-doped silica. Those having ordinary skill in the art will appreciate that, depending on the desired optical properties, other dopants may be used as long as the transmission and confinement functions are achieved.

The present invention embraces the incorporation of metallic nanostructures in the optical fiber in order to generate Surface Plasmon Resonance (SPR). The term "nanostructure" refers to an assembly of several hundred to several thousand atoms and/or molecules, which result in a particle with at least one nanometric dimension (i.e., a dimension, such as length or thickness, that is between 1 nanometer and 100 nanometers) and that has specific physic-chemical properties. The term "metallic nanostructures" refers to nanostructures that include at least one assembly of metallic atoms. The term "type of nanostructure" refers to nanostructures having a shape, size, and composition such that the frequency of their surface plasmon resonance ($\omega_{plasmon}$) is defined and controlled.

Figure 1:
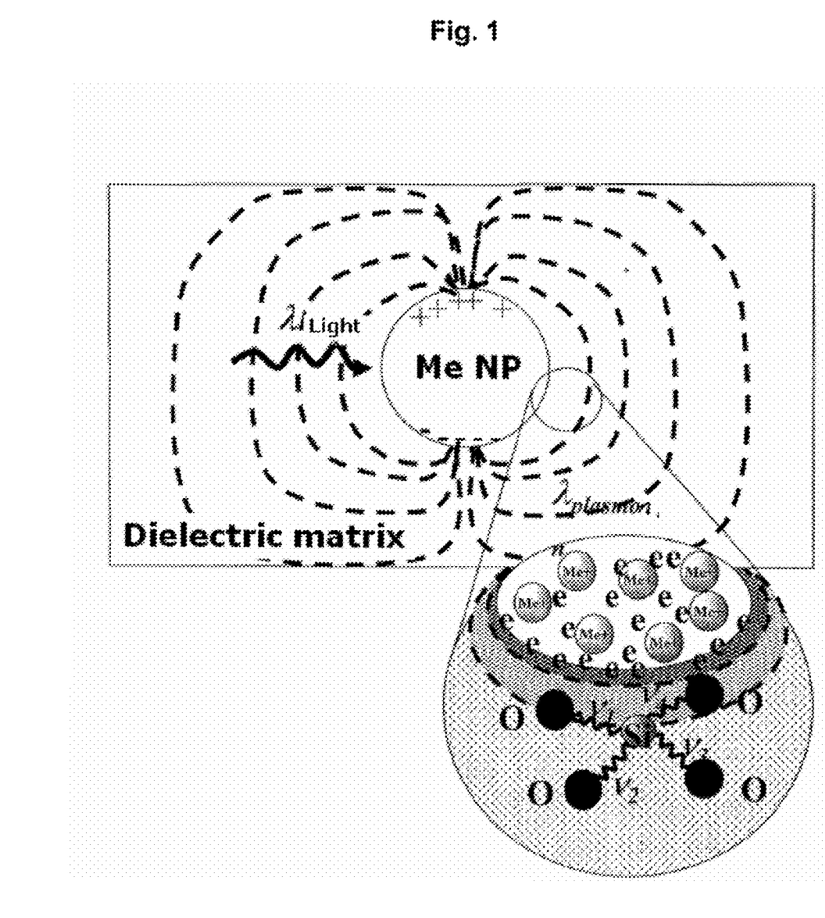
FIG. 1 schematically depicts the phenomenon of surface plasmon resonance.

FIG. 1 schematically illustrates the phenomenon of surface plasmon resonance (SPR). In a metal, the electrons are largely free in their movements with little interaction with their respective nuclei due to a Coulomb shielding effect. At a nanoscopic level, the electric field of an incident light wave will induce, at the metallic/dielectric interface, a polarization of the electrons relative to the ionic nuclei of the metallic atoms. A net charge is thus produced, and the electrons can oscillate coherently at a frequency ($\omega_{plasmon}$) that depends on the nature of the metal and the shape and size of the nanostructure. When the nanostructure is properly chosen (geometry, shape, size, composition), the electron surface that is polarized in this way can concentrate energy and amplify local electric fields around the nanostructure.

Figure 2:
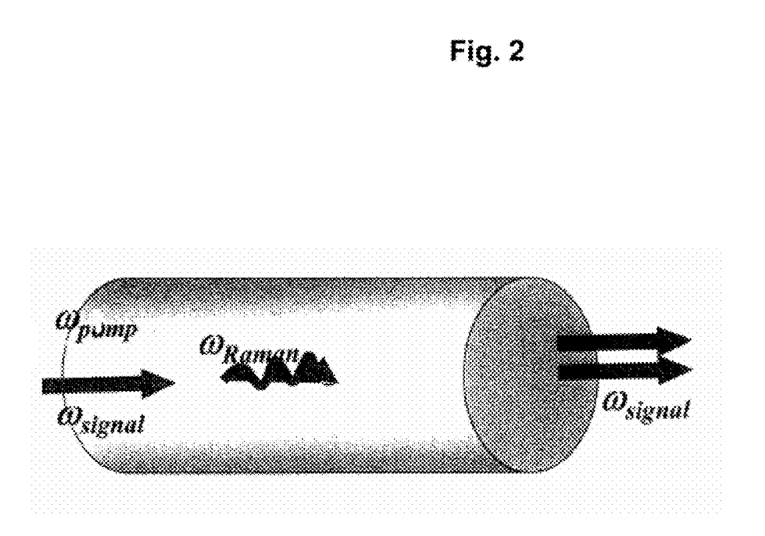
FIG. 2 schematically depicts a standard optical fiber amplifier using the Raman effect.

FIG. 2 schematically illustrates a standard Raman fiber amplifier. The standard optical fiber amplifier includes a core composed of a dielectric matrix that is capable of (i) transmitting a signal that propagates at a given frequency ($\omega_{signal}$) and (ii) amplifying that signal by Raman effect under the effect of a pump signal emitted at a given frequency ($\omega_{pump}$). Thus, the vibration frequency ($\omega_{plasmon}$) of the core matrix is determined by its composition and is chosen so that a portion of the energy from the pump is transmitted by Raman effect ($P_s$) to signal frequency ($\omega_{signal}$).

This energy transmitted to the signal is proportional in accordance with the following:

$$P_s(\omega_s) \propto N \cdot \sigma_{Raman} \cdot I_p(\omega_{pump})$$

where

N is the number of Raman-active vibrations of the matrix;
Raman is the effective Raman cross-section of the matrix (i.e., proportional to the Raman coefficient $g_R$); and
$I_P(\omega_{pump})$ is the incident intensity of the pump signal.

Figure 3:
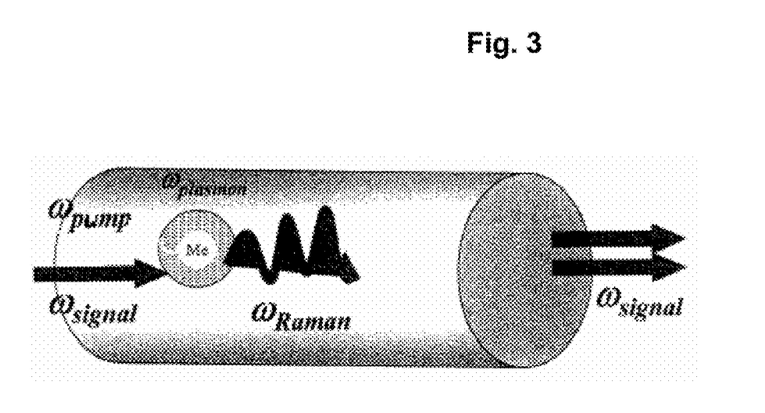
FIG. 3 schematically depicts an exemplary embodiment of a Raman optical fiber amplifier according to the present invention.

FIG. 3 schematically illustrates an exemplary optical fiber according to the present invention. The exemplary optical fiber amplifier includes a core composed of a dielectric matrix that is capable of (i) transmitting a signal that propagates at a given frequency ($\omega_{signal}$) and (ii) amplifying that signal by Raman effect under the effect of a pump signal emitted at a given frequency ($\omega_{pump}$). Thus, the vibration frequency ($\omega_{Raman}$) of the core matrix is determined by its composition and is chosen in such a way that a portion of the energy from the pump is transmitted by Raman effect ($P_S$) to the signal frequency ($\omega_{signal}$).

In contrast to the standard Raman fiber amplifier depicted in FIG. 2, the exemplary optical fiber amplifier depicted in FIG. 3 intensifies the Raman effect according to the invention by the introduction of metallic nanostructures into the optical fiber.

Without being bound to any theory, this effect is a result of two phenomena:

(1) the increase in the effective Raman cross-section of the matrix ($\omega_{Raman}$) by a factor of approximately 100 (~100×) due to the change in the environment of the bonds in the matrix ($\sigma_{SPR} > \sigma_{Raman}$); and (2) the concentration of the electromagnetic field in the vicinity of the metallic nanostructure.

In this case, the portion of the pump energy transmitted by Raman effect ($P_s$) to the signal frequency ($\omega_{signal}$) is proportional in accordance with the following:

$$P_s(\omega_s) \propto N \cdot \sigma_{SPR} \cdot F^2(\omega_{signal}) \cdot F^2(\omega_{pump}) \cdot I_p(\omega_{pump})$$

where

N is the number of Raman-active vibrations of the matrix;

$\sigma_{SPR}$ is the effective Raman cross-section of the matrix modified by the presence of the nanostructures;

$I_P(\omega_{pump})$ is the incident intensity of the pump signal;

$F(\omega_{pump})$ is the factor of the increase in the amplitude of the local electromagnetic field in the vicinity of a metallic nanostructure at the pump frequency; and $F(\omega_{signal})$ is the factor of the increase in the amplitude of the local electromagnetic field in the vicinity of a metallic nanostructure at the signal frequency.

In theory, the factors F can be greater than 1,000 and depend on the fiber core material, (e.g., the dielectric properties of the matrix, the shape and size of the metallic nanostructures, and the nature of the metal, such as silver or gold).

Thus, the total increase in the Raman amplification related to the introduction of the metallic nanostructures according to the invention results in an increase in the effective Raman cross-section $\sigma_{SPR}$, and an increase in the amplitude of the local electromagnetic field in the vicinity of the metallic nanostructures at the pump $F(\omega_{pump})$ and/or signal $F(\omega_{signal})$ frequencies.

In accordance with the present invention and depending on the desired application, the size, shape, and nature of the metallic nanostructures introduced into the optical fiber's core matrix can be adapted to resonate ($\omega_{plasmon}$) with either the pump ($\omega_{pump}$) and/or the signal transmitted ($\omega_{signal}$). To obtain simultaneous resonance with the pump and the signal, the nanostructures introduced into the optical fiber's core must meet an additional condition: the resonance bandwidth of the nanostructures must be greater than the Raman vibration frequency of the matrix of the fiber core ($\omega_{Raman}$). This embodiment is advantageous as it allows for a maximum increase (~$F^4$) in the Raman effect by simultaneously increasing the amplitude intensity of the local electromagnetic field at two frequencies, namely $F^2(\omega_{signal}) \cdot F^2(\omega_{pump})$.

The nanostructures are chosen, on the one hand, by their size, geometry, shape, nature, and concentration so that the maximum surface plasmon resonance (SPR) effect occurs at a chosen, controlled frequency, and, on the other hand, in order not to perturb the transmission of the optical signal in the optical fiber. Thus, an exemplary optical fiber according to the present invention can have a Raman FOM greater than 10 $W^{-1} \cdot dB^{-1}$, or even greater than 20 $W^{-1} \cdot dB^{-1}$.

According to exemplary embodiments, the metallic nanostructures can be introduced into the optical fiber's core and/or into its cladding, particularly in a ring of the optical cladding that surrounds the core. The ring, which is part of the optical cladding, may be separated from the core (i.e., not immediately surrounding the core) or, more typically, directly adjacent to the core (i.e., immediately surrounding the core).

If metallic nanostructures are introduced both into the core and into the optical cladding, it is possible to choose different kinds of nanostructures. In other words, the size, composition, geometry, and shape of the nanostructures introduced into the core can be different from the size, composition, geometry, and shape of the nanostructures introduced into the cladding.

If metallic nanostructures are introduced into a ring surrounding the optical fiber's core, the pump signal can be transmitted in the ring and the nanostructures will be specifically chosen to resonate ($\omega_{plasmon}$) with the pump ($\omega_{pump}$). The optical signal to be amplified is still transmitted in the core.

The presence of metallic nanostructures in the optical fiber's core and/or a ring surrounding the core affects the optical fiber's opto-geometric conditions and modifies the signal transmission conditions.

First, it is necessary to limit the optical losses caused by the metallic nanostructures (e.g., related to their size and their concentration in the optical fiber). The introduction of metallic nanostructures into the optical fiber's core or near the core (e.g., in a ring directly surrounding the core) modifies the core's effective refractive index and can lead to an increase in the optical losses through scattering. Moreover, the metallic nanostructures incorporated into the optical fiber can modify the physic-chemical properties of the core matrix and of the optical cladding, particularly its viscosity. This can render the material incompatible with the optical-fiber production constraints, particularly fiber-drawing temperatures.

Accordingly, it is thought that, to retain a material that can be drawn in standard industrial conditions and to obtain an optical fiber with limited losses, (i) one of the nanoscopic dimensions of the metallic nanostructures ought to be less than 20 nanometers and (ii) the volumetric concentration of the metallic nanostructures in the optical fiber ought to be less than 2 percent of the core's volume.

If metallic nanostructures are only introduced in a ring of the optical cladding and not in the core of the optical fiber, the optical losses will be reduced. The surface plasmon resonance (SPR), however, will be able to occur only with the pump signal and not with the transmitted signal.

In accordance with the present invention, metallic nanostructures may include gold (Au), silver (Ag), copper (Cu), aluminum (Al), tungsten (W), nickel (Ni), palladium (Pd), rhodium (Rh), iridium (Ir), ruthenium (Ru), molybdenum (Mo), osmium (Os), and/or platinum (Pt) (e.g., a combination of two or more of such metals).

Such nanostructures typically have high melting temperatures (e.g., 950° C. or higher) and an evaporating temperature of 2100° C. or higher. This facilitates fiber drawing while retaining the nanostructures in the optical fiber's silica-based matrix. The nanostructures may liquefy during fiber drawing but typically do not evaporate. The nanostructures have good chemical oxidation stability and a high electron density, ensuring the presence of a sufficiently large electron cloud for the occurrence of the phenomenon of surface plasmon resonance (SPR) under the effect of a light signal.

The dielectric matrix of the optical fiber's central core, which is typically silica-based, can be doped with one or more elements, such as germanium (Ge), phosphorus (P), fluorine (F), boron (B), aluminum (Al), tantalum (Ta), and/or tellurium (Te) (e.g., a combination of two or more of such dopants). Alternatively, the dielectric matrix may be another composition, such as germanium oxide or tellurite, and can include dopants (e.g., germanium, phosphorus, antimony, and/or thallium).

Table 1 (below) provides the respective melting temperatures and evaporating temperatures of the metals that can be used for the exemplary nanostructures employed in accordance with the present invention:

TABLE 1

| Metal | Melting Temperature (° C.) | Evaporating Temperature (° C.) |
|---|---|---|
| Au | 1065 | 3054 |
| Ag | 961 | 2162 |
| Cu | 1085 | 2554 |
| Al | 660 | 2519 |
| W | 3407 | 5658 |
| Ni | 1453 | 2913 |
| Pd | 1550 | 2963 |
| Rh | 1966 | 3695 |
| Ir | 2443 | 4428 |
| Ru | 2250 | 4150 |
| Mo | 2617 | 4639 |
| Os | 3027 | 5009 |
| Pt | 1772 | 3825 |

In accordance with the present invention, the shape of the metallic nanostructures can vary in order to adjust their SPR resonance frequency ($\omega_{plasmon}$) depending on their size, their nature, and the desired application. The metallic nanostructures can possess a spherical shape or an oval shape, and/or can have a core-shell structure (i.e., a core surrounding by one or more shells). An oval or core-shell nanostructure facilitates an increase in the contact surface with the optical fiber's dielectric matrix and thus leads to an increase in the electron density around the nanostructures.

The intensity, wavelength, and range of the surface plasmon resonance of the nanostructures are essentially related to the choice of nanostructure parameters (e.g., nature of the metal, geometry, concentration). For example, the metallic nanostructures must typically have at least one dimension that is significantly smaller than the wavelength of the excitation light signal. For exemplary spherical nanostructures, the diameter is typically between 1 nanometer and 10 nanometers. For exemplary oval nanostructures, the small diameter is typically between 1 nanometer and 10 nanometers. For exemplary core-shell nanostructures, the outer diameter is typically less than 20 nanometers and the thickness of a metallic shell is typically limited to 5 nanometers. Typically, most of the nanostructures, if not predominately all or even all of the nanostructures, have at least one dimension between about 1 nanometer and 20 nanometers.

The diameter of the core-shell nanostructures is typically larger than that of the spherical nanostructures or oval nanostructures because the core-shell nanostructures are partly made up of dielectric and, consequently, absorb the light signal less than the spherical or oval nanostructures, each of which is made entirely of metal. Despite its typically larger diameter, a core-shell nanostructure typically has optical losses of the same order as the optical losses caused by a spherical nanostructure or an oval nanostructure.

Figure 4:
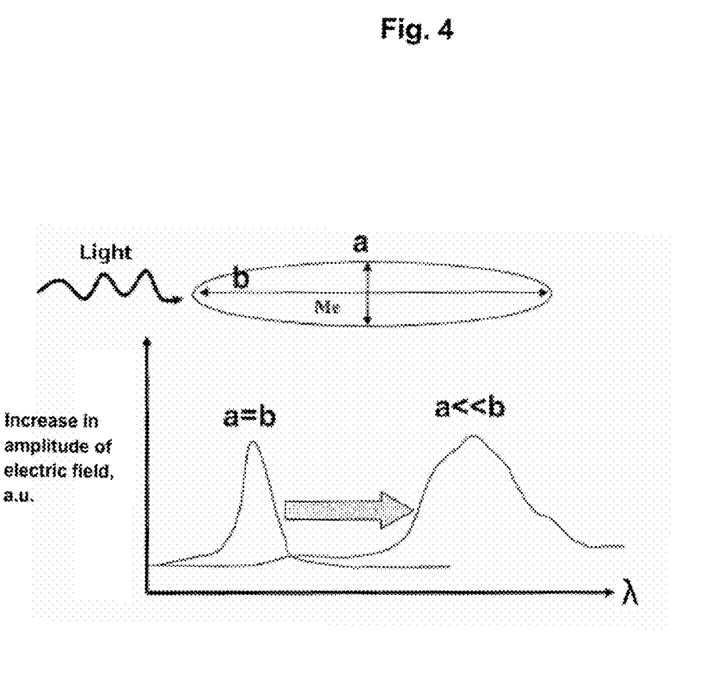
FIG. 4 schematically depicts a first exemplary nanostructure in an optical fiber according to the present invention.

FIG. 4 shows one exemplary nanostructure that can be used in an optical fiber according to the present invention.

For spherical metallic nanostructures (a=b), the light signal propagating in the optical fiber causes a phenomenon of surface plasmon resonance (SPR). This leads to an increase in the amplitude of the electric field of the light wave at a given wavelength, depending on the metallic composition. If the nanostructure is oval (a<<b), the surface plasmon resonance frequency ($\omega_{plasmon}$) will be shifted toward the lowest frequencies and widened. This is schematically depicted in FIG. 4.

For example, for gold metallic nanostructures, the ovalization of the nanostructure with a ratio between the large diameter and the small diameter (b/a) of less than 2000 (e.g., typically less than 1000) will allow for the surface plasmon resonance frequency to be shifted toward the band used in telecommunications (band C in particular). Oval nanostructures, therefore, typically have a small diameter (a) of between 1 nanometer and 10 nanometers and a large diameter (b) of between 10 nanometers and 1500 nanometers (i.e., a length comparable to the wavelength of a telecom's optical signal).

The ovalization of the metallic nanostructures can be controlled by adjusting the production parameters of the optical fiber, particularly during the fiber-drawing stage. For example, the melting temperature of gold is 1064° C., but fiber drawing occurs at a temperature between about 1700° C. and 2200° C. Consequently, during fiber drawing, the gold nanostructures will behave viscously and will be easily deformable during the homothetic transformation of the optical-fiber perform.

In addition to the frequency shifting of the surface plasmon resonance (SPR), the ovalization of the metallic nanostructures permits a widening of the surface plasmon resonance band. Efficient Raman amplification can therefore be ensured on a wider bandwidth, particularly for Wavelength Division Multiplexing (WDM) applications, by ensuring maximum Raman effect by simultaneous amplification of the pump and the signal.

Figure 5:
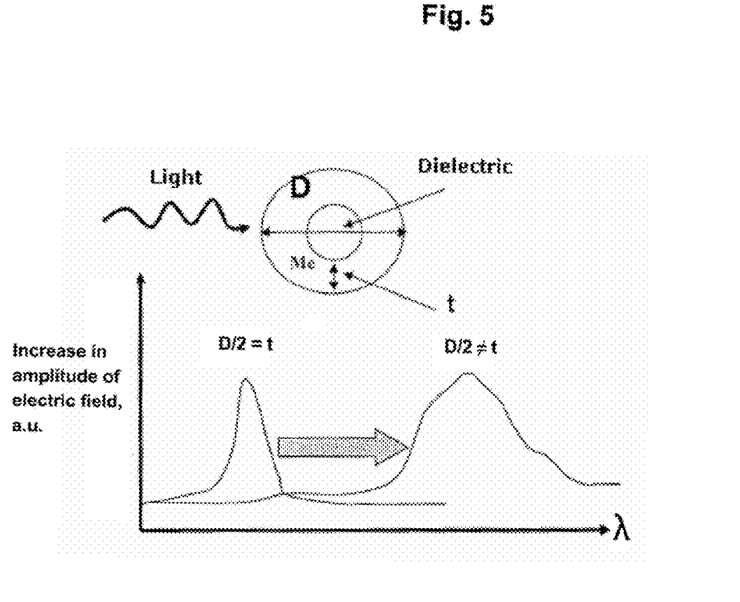
FIG. 5 schematically depicts a second exemplary nanostructure in an optical fiber according to the present invention.

FIG. 5 shows another exemplary nanostructure (i.e., a core-shell nanostructure) that can be used in an optical fiber according to the present invention. The illustrated core-shell nanostructure has a dielectric core and a metallic external shell having an outer diameter D and a shell thickness t. When the outer radius (D/2) is equal to the thickness t, this corresponds to a pure metallic nanostructure (e.g., a spherical nanostructure). When the nanostructure has a core-shell form, the surface plasmon resonance frequency ($\omega_{plasmon}$) is shifted toward the lowest frequencies and spread out relative to a spherical metallic nanostructure. This is illustrated in FIG. 5.

For example, nanostructures having a silica core and a gold layer may be used. Those having ordinary skill in the art will appreciate that the dielectric of the nanoparticle's core can differ from that of the optical fiber's dielectric matrix. Control of the surface plasmon resonance (SPR) frequency may be achieved by varying the shell's diameter D and thickness t. A diameter-to-thickness ratio (D/t) of about 10 helps to achieve an SPR frequency within the band used in standard telecommunications. Core-shell nanostructures typically have a diameter D between 1 and 20 nanometers and a shell thickness t of less than 5 nanometers. Typically, the ratio between the diameter of the non-metallic core and the total diameter of the nanostructure (D) is between 0.5 and 1, typically greater than 0.8 (e.g., 0.9). By way of example, for a core-shell nanostructure with only one shell, such as depicted in FIG. 5, the ratio between the diameter of the non-metallic core (D−2t) and the total diameter of the nanostructure (D) is (D−2t)/D.

In addition to the SPR frequency shifting, core-shell metallic nanostructures allow for a widening of the surface plasmon resonance band. Efficient Raman amplification can therefore be ensured on a wider bandwidth, particularly for Wavelength Division Multiplexing (WDM) applications, by ensuring maximum Raman effect by simultaneous amplification of the pump and the signal.

Figure 6:
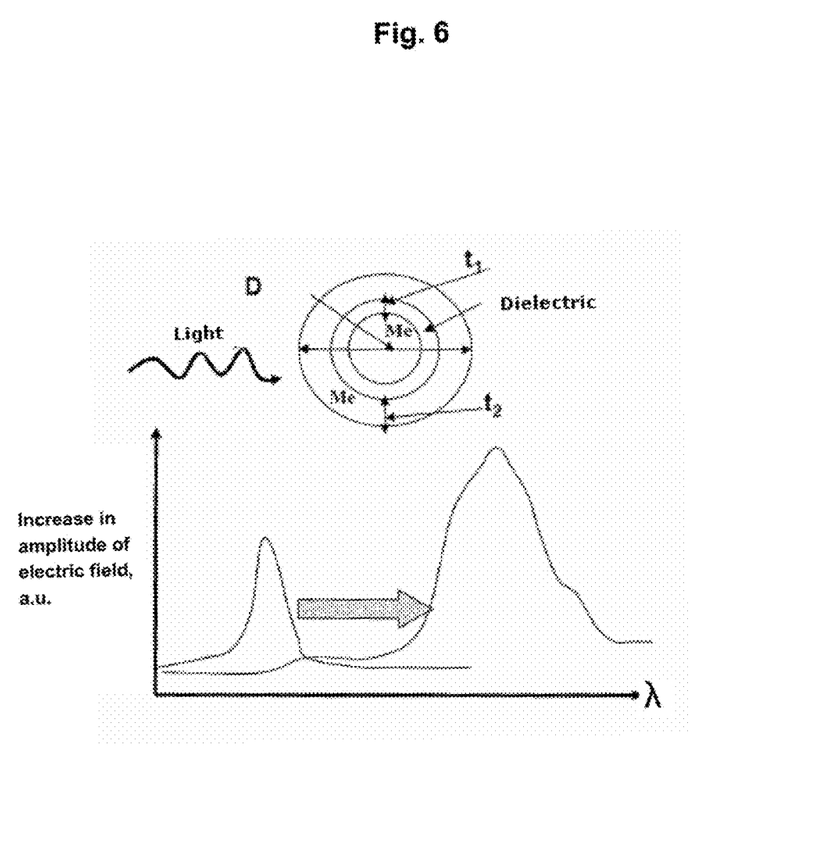
FIG. 6 schematically depicts a third exemplary nanostructure in an optical fiber according to the present invention.

FIG. 6 shows yet another exemplary nanostructure that can be used in an optical fiber according to the present invention.

The illustrated core-shell nanostructure has a metallic central core, an internal dielectric shell, and an external metallic shell. The nanostructure has an outer diameter D, a thickness $t_1$ of the internal dielectric shell, and a thickness $t_2$ of the external metallic shell. When the nanostructure has this kind of form, the surface plasmon resonance frequency ($\omega_{plasmon}$) is shifted toward the lowest frequencies and spread out relative to a spherical nanostructure. This is depicted in FIG. 6. In addition, the intensity of the electric field of the light wave is increased. Such metallic nanostructures can advantageously be used for Wavelength Division Multiplexing (WDM) applications.

For instance, one exemplary nanostructure includes a gold metallic core, a silica internal shell, and a gold external shell. The total diameter D of such nanostructures is typically between 1 nanometer and 20 nanometers and the thickness of the external metallic shell $t_2$ is typically less than 5 nanometers. Control of the surface plasmon resonance (SPR) frequency ($\omega_{plasmon}$) and the resonance bandwidth may be achieved by varying the diameter D and the respective shell thicknesses $t_1$ and $t_2$.

The dielectric of the nanoparticle's internal shell may differ from the optical fiber's dielectric matrix. Moreover, nanoparticles employed in accordance with the present invention may include different kinds of metals in the nanostructure's core and the nanostructure's external shell.

Other exemplary metallic nanostructures are within the scope of the present invention. For example, several different kinds of metallic nanostructure (e.g., spherical nanostructures, oval nanostructures, and/or core-shell nanostructures) may be incorporated into a single optical fiber. In this regard and as noted previously, the total volumetric concentration of the nanoparticles typically remains below 2 percent of the volume of the optical fiber's core. When different kinds of metallic nanostructures are introduced into an optical fiber, each kind of nanostructure can include a different metal, shape, and size from the other nanostructures.

Figure 7:
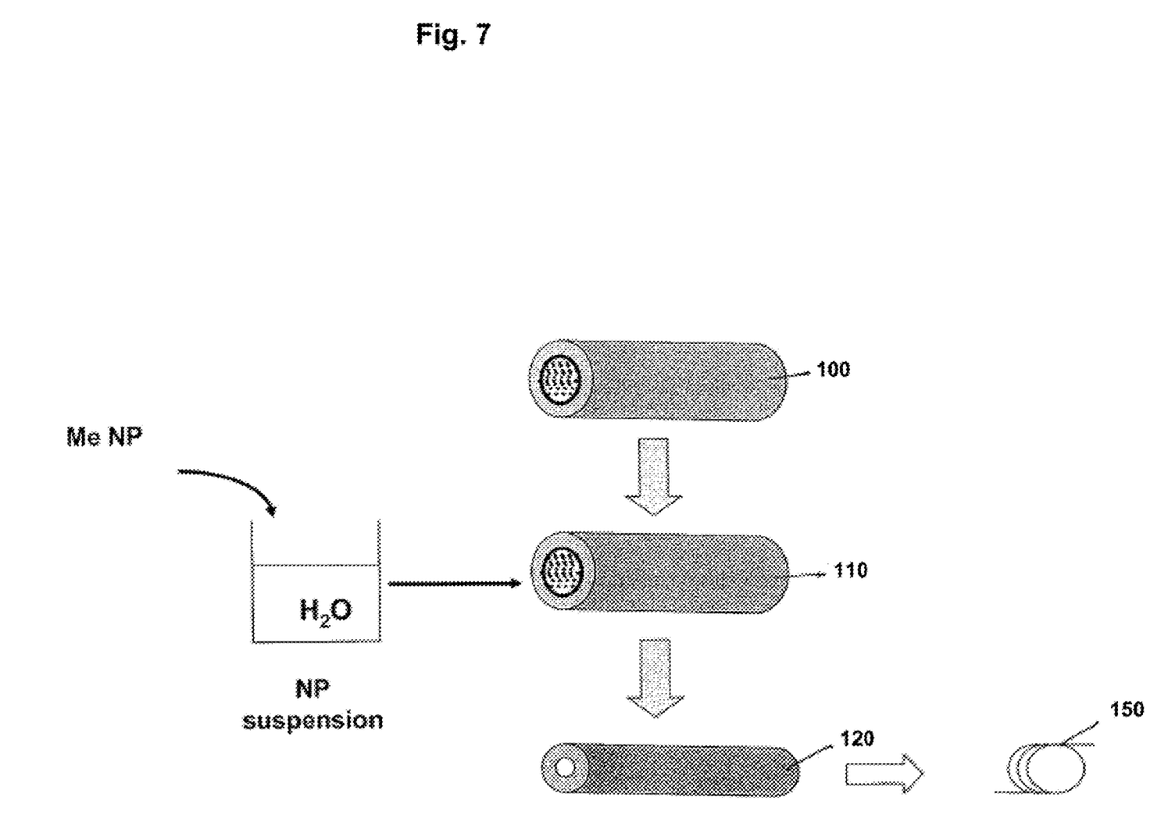
FIG. 7 schematically depicts the exemplary production of an optical fiber according to the present invention.

FIG. 7 schematically depicts an exemplary process for manufacturing an optical fiber according to the present invention.

The metallic nanostructures (Me NP) can be produced by chemical or physical synthesis techniques (e.g., a sol-gel method) that are known to those having ordinary skill in the art. For instance, the core-shell metallic nanostructures can be produced by forming nanoparticles via chemical or physical synthesis, which results in a powder of nanoscopic grains, and then by making one or more deposits on the powder via chemical or physical deposition. The nanostructures are then dispersed in an aqueous solution to yield a stable suspension of nanostructures.

A silica tube 100 with a porous core and a cladding formed by a silica tube may be produced by Modified Chemical Vapor Deposition (MCVD). The solution of nanostructures in stable suspension is then used to impregnate the porous core of the silica tube 110 (e.g., during an MCVD operation) to form the core of the primary preform and, optionally, a ring (e.g., an internal cladding).

Next, a vitrification and extrusion operation 120 yields a primary optical preform. A subsequent overcladding operation achieves a final optical preform, which can be used on a fiber-drawing tower to draw the optical fiber 150.

The resulting optical fiber includes a core and, if applicable, a ring, composed of a dielectric matrix enhanced with metallic nanostructures, which facilitates the occurrence of a surface plasmon resonance (SPR) phenomenon to amplify a pump and/or signal wavelength.

Depending on the desired applications, the power of the pump can be reduced to permit the use of less costly equipment. In addition, the length of the optical fiber amplifier can be reduced to make the equipment more compact.

By way of comparison, a standard optical fiber amplifier having a heavily germanium-doped, silica-based core e.g., between about 20 and 25 weight percent of germanium with an effective area of 10 $\mu cm^2$) will have a Raman FOM of 8 $W^{-1} \cdot dB^{-1}$ for an optimum fiber length of 900 meters. In contrast, an exemplary optical fiber according to the present invention may have, for the same effective area, a Raman FOM much greater than 10 $W^{-1} \cdot dB^{-1}$ (e.g., 20 $W^{-1} \cdot dB^{-1}$ or more) for an optimum fiber length of less than 500 meters.

An optical fiber in accordance with the present invention can be used in an optical amplifier with significant amplification gain and improved compactness relative to the state of the art. Such an optical fiber can also be used in a laser with improved compactness.

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (de Montmorillon et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. patent application Ser. No. 12/098,804 for a Transmission Optical Fiber Having Large Effective Area (Sillard et al.), filed Apr. 7, 2008; International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Patent Application Publication No. US2009/0279836 A1 for a Bend-Insensitive Single-Mode Optical Fiber, filed May 6, 2009, (de Montmorillon et al.); U.S. patent application Ser. No. 12/489,995 for a Wavelength Multiplexed Optical System with Multimode Optical Fibers, filed Jun. 23, 2009, (Lumineau et al.); U.S. patent application Ser. No. 12/498,439 for a Multimode Optical Fibers, filed Jul. 7, 2009, (Gholami et al.); U.S. patent application Ser. No. 12/614,011 for a Reduced-Diameter Optical Fiber, filed Nov. 6, 2009, (Overton); U.S. patent application Ser. No. 12/614,172 for a Multimode Optical System, filed Nov. 6, 2009, (Gholami et al.); U.S. patent application Ser. No. 12/617,316 for an Amplifying Optical Fiber and Method of Manufacturing, filed Nov. 12, 2009, (Pastouret et al.) U.S. patent application Ser. No. 12/629,495 for an Amplifying Optical Fiber and Production Method, filed Dec. 2, 2009, (Pastouret et al.); U.S. patent application Ser. No. 12/633,229 for an Ionizing Radiation-Resistant Optical Fiber Amplifier, filed Dec. 8, 2009, (Regnier et al.); U.S. patent application Ser. No. 12/636,277 for a Buffered Optical Fiber, filed Dec. 11, 2009, (Testu et al.); U.S. patent application Ser. No. 12/683,775 for a Method of Classifying a Graded-Index Multimode Optical Fiber, filed Jan. 7, 2010, (Gholami et al.); U.S. patent application Ser. No. 12/692,161 for a Single-Mode Optical Fiber, filed Jan. 22, 2010, (Richard et al.); U.S. patent application Ser. No. 12/694,533 for a Single-Mode Optical Fiber Having an Enlarged Effective Area, filed Jan. 27, 2010, (Sillard et al.); and U.S. patent application Ser. No. 12/694,559 for a Single-Mode Optical Fiber, filed Jan. 27, 2010, (Sillard et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Patent Application Publication No. US2009/0041414 A1 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Patent Application Publication No. US2009/0003785 A1 for a Coupling Composition for Optical Fiber Cables (Parris et al.); U.S. Patent Application Publication No. US2009/0214167 A1 for a Buffer Tube with Hollow Channels, (Lookadoo et al.); U.S. patent application Ser. No. 12/466,965 for an Optical Fiber Telecommunication Cable, filed May 15, 2009, (Tatat); U.S. patent application Ser. No. 12/506,533 for a Buffer Tube with Adhesively Coupled Optical Fibers and/or Water-Swellable Element, filed Jul. 21, 2009, (Overton et al.); U.S. patent application Ser. No. 12/557,055 for an Optical Fiber Cable Assembly, filed Sep. 10, 2009, (Barker et al.); U.S. patent application Ser. No. 12/557,086 for a High-Fiber-Density Optical Fiber Cable, filed Sep. 10, 2009, (Louie et al.); U.S. patent application Ser. No. 12/558,390 for a Buffer Tubes for Mid-Span Storage, filed Sep. 11, 2009, (Barker); U.S. patent application Ser. No. 12/614,692 for Single-Fiber Drop Cables for MDU Deployments, filed Nov. 9, 2009, (Overton); U.S. patent application Ser. No. 12/614,754 for Optical-Fiber Loose Tube Cables, filed Nov. 9, 2009, (Overton); U.S. patent application Ser. No. 12/615,003 for a Reduced-Size Flat Drop Cable, filed Nov. 9, 2009, (Overton et al.); U.S. patent application Ser. No. 12/615,106 for ADSS Cables with High-Performance Optical Fiber, filed Nov. 9, 2009, (Overton); U.S. patent application Ser. No. 12/615,698 for Reduced-Diameter Ribbon Cables with High-Performance Optical Fiber, filed Nov. 10, 2009, (Overton); U.S. patent application Ser. No. 12/615,737 for a Reduced-Diameter, Easy-Access Loose Tube Cable, filed Nov. 10, 2009, (Overton); U.S. patent application Ser. No. 12/642,784 for a Method and Device for Manufacturing an Optical Preform, filed Dec. 19, 2009, (Milicevic et al.); U.S. patent application Ser. No. 12/648,794 for a Perforated Water-Blocking Element, filed Dec. 29, 2009, (Parris); U.S. patent application Ser. No. 12/649,758 for a UVLED Apparatus for Curing Glass-Fiber Coatings, filed Dec. 30, 2009, (Hartsuiker et al.); and U.S. patent application Ser. No. 12/700,293 for a Central-Tube Cable with High-Conductivity Conductors Encapsulated with High-Dielectric-Strength Insulation, filed Feb. 4, 2010, (Ryan et al.).

In the specification and/or figures, typical embodiments of the invention have been disclosed. The present invention is

The invention claimed is:

1. An amplifying optical fiber, comprising:
a core comprising a dielectric matrix that vibrates at a given frequency ($\omega_{Raman}$) under the effect of a pump signal such that an optical signal transmitted within the core is amplified by stimulated Raman scattering effect (SRS);
an optical cladding surrounding the core; and
one or more kinds of metallic nanostructures capable of generating a surface plasmon resonance (SPR) in the optical fiber;
wherein the metallic nanostructures have a shape and a composition such that the frequency of their surface plasmon resonance ($\omega_{plasmon}$) corresponds to the frequency of the pump signal ($\omega_{pump}$) and/or the frequency of the optical signal transmitted in the optical fiber ($\omega_{signal}$);
wherein, over the length of the optical fiber, the optical fiber's cross-sectional profile with respect to nanostructure concentration is substantially uniform;
wherein, for most of the metallic nanostructures, at least one of the dimensions is between about 1 nanometer and 20 nanometers; and
wherein the total volume of the metallic nanostructures in the optical fiber is less than about 2 percent of the total volume of the optical fiber's entire core.

2. The optical fiber according to claim 1, wherein the metallic nanostructures are present in the optical fiber's core.

3. The optical fiber according to claim 2, wherein the metallic nanostructures have a shape and a composition such that the bandwidth of their surface plasmon resonance is greater than the vibration frequency of the dielectric matrix ($\omega_{Raman}$) of the optical fiber's core.

4. The optical fiber according to claim 1, wherein the metallic nanostructures are present in a ring of the optical cladding surrounding the optical fiber's core such that the optical signal is transmitted in the optical fiber's core and the pump signal is transmitted in the ring.

5. The optical fiber according to claim 1, wherein the core's dielectric matrix is silica-based.

6. The optical fiber according to claim 1, wherein the core's dielectric matrix is (i) silica-based and (ii) doped with germanium (Ge), phosphorus (P), fluorine (F), boron (B), aluminum (Al), tantalum (Ta), and/or tellurium (Te).

7. The optical fiber according to claim 1, wherein the metallic nanostructures comprise gold (Au), silver (Ag), copper (Cu), aluminum (Al), tungsten (W), nickel (Ni), palladium (Pd), rhodium (Rh), iridium (Ir), ruthenium (Ru), molybdenum (Mo), osmium (Os), and/or platinum (Pt).

8. The optical fiber according to claim 1, wherein the metallic nanostructures have a melting temperature of 950° C. or higher.

9. The optical fiber according to claim 1, wherein the metallic nanostructures have an evaporating temperature of 2100° C. or higher.

10. The optical fiber according to claim 1, wherein the metallic nanostructures comprise metallic nanostructures that have a spherical shape and a diameter between about 1 nanometer and 10 nanometers.

11. The optical fiber according to claim 1, wherein:
the metallic nanostructures comprise metallic nanostructures that have an oval shape defining a small diameter (a) and a large diameter (b); and
the small diameter (a) is between about 1 nanometer and 10 nanometers and the ratio of the large diameter to the small diameter (b/a) is between about 1 and 2000.

12. The optical fiber according to claim 1, wherein the metallic nanostructures comprise metallic nanostructures that have a dielectric core surrounded by an external metallic shell having an outer diameter (D) of between about 1 nanometer and 20 nanometers and a thickness (t) of less than 5 nanometers, the ratio between the diameter of the dielectric nanostructure core and the outer diameter of the external metallic shell being between 0.5 and 1.

13. The optical fiber according to claim 1, wherein:
the metallic nanostructures comprise metallic nanostructures that have a metallic core, an internal dielectric shell, and an external metallic shell;
the metallic nanostructures have an outer diameter (D) of between about 1 nanometer and 20 nanometers; and
external metallic shell has a thickness ($t_2$) of less than about 5 nanometers.

14. The optical fiber according to claim 1, wherein, for substantially all of the metallic nanostructures, at least one of the dimensions is between about 1 nanometer and 20 nanometers.

15. The optical fiber according to claim 1, wherein the optical fiber has a Raman Figure of Merit (FOM) of greater than $10\ W^{-1} \cdot dB^{-1}$ for a fiber length of less than 500 meters, the Raman Figure of Merit being defined as the ratio between the optical fiber's Raman coefficient ($C_R$) and the optical fiber's losses, the optical fiber's Raman coefficient ($C_R$) being defined as the ratio between the intrinsic Raman gain ($g_R$) of the core material and the optical fiber's effective area ($A_{\it{eff}}$) at the pump wavelength.

16. The optical fiber according to claim 15, wherein the optical fiber has a Raman Figure of Merit (FOM) of greater than $20\ W^{-1} \cdot dB^{-1}$ for a fiber length of less than 500 meters.

17. An optical amplifier comprising at least a portion of the optical fiber according to claim 1.

18. A laser comprising at least a portion of the optical fiber according to claim 1.

19. A stimulated Raman scattering effect (SRS), amplifying optical fiber, comprising:
a central core formed of a core material;
an optical cladding surrounding the central core; and
one or more kinds of metallic nanostructures for generating a surface plasmon resonance (SPR);
wherein the optical fiber has a Raman Figure of Merit (FOM) of greater than $10\ W^{-1} \cdot dB^{-1}$ for a fiber length of less than 500 meters, the Raman Figure of Merit being defined as the ratio between the optical fiber's Raman coefficient ($C_R$) and the optical fiber's losses, the optical fiber's Raman coefficient ($C_R$) being defined as the ratio between the intrinsic Raman gain ($g_R$) of the core material and the optical fiber's effective area ($A_{\it{eff}}$) at the pump wavelength.

20. The amplifying optical fiber according to claim 19, wherein:
the optical fiber's cross-sectional profile with respect to nanostructure concentration is substantially uniform over the length of the optical fiber; and
the total volume of the metallic nanostructures in the optical fiber is less than about 2 percent of the total volume of the optical fiber's entire core.

21. The amplifying optical fiber according to claim 19, wherein the metallic nanostructures are present in a ring of the optical cladding surrounding the optical fiber's core such that the optical signal is transmitted in the optical fiber's core and the pump signal is transmitted in the ring.

22. The amplifying optical fiber according to claim 19, wherein the core's dielectric matrix is (i) silica-based and (ii) doped with germanium (Ge), phosphorus (P), fluorine (F), boron (B), aluminum (Al), tantalum (Ta), and/or tellurium (Te).

23. The amplifying optical fiber according to claim 19, wherein the metallic nanostructures comprise gold (Au), silver (Ag), copper (Cu), aluminum (Al), tungsten (W), nickel (Ni), palladium (Pd), rhodium (Rh), iridium (Ir), ruthenium (Ru), molybdenum (Mo), osmium (Os), and/or platinum (Pt).

24. The amplifying optical fiber according to claim 19, wherein:
   the metallic nanostructures comprise metallic nanostructures that have an oval shape defining a small diameter (a) and a large diameter (b); and
   the small diameter (a) is between about 1 nanometer and 10 nanometers and the ratio of the large diameter to the small diameter (b/a) is between about 1 and 2000.

25. The amplifying optical fiber according to claim 19, wherein, for substantially all of the metallic nanostructures, at least one of the dimensions is between about 1 nanometer and 20 nanometers.

26. The amplifying optical fiber according to claim 19, wherein the amplifying optical fiber is a single-mode optical fiber.

* * * * *